United States Patent [19]

Rodgers et al.

[11] 4,282,126

[45] Aug. 4, 1981

[54] POLYISOBUTYLENE RUBBER ANTIFOULING PAINT

[75] Inventors: Stephen D. Rodgers, Bowie; Bernard R. Appleman, Gaithersburg, both of Md.

[73] Assignee: The United States of America as represented by the Secretary of the Navy, Washington, D.C.

[21] Appl. No.: 69,192

[22] Filed: Aug. 24, 1979

[51] Int. Cl.$^3$ ............................................... C08L 93/04
[52] U.S. Cl. .................................. 260/27 R; 106/16; 260/42.46; 424/83
[58] Field of Search ..................... 260/27 R; 106/16; 424/83

[56] References Cited

U.S. PATENT DOCUMENTS

| | | | |
|---|---|---|---|
| 3,033,809 | 5/1962 | Saroyan et al. | 106/16 |
| 3,615,744 | 10/1971 | Toyonaka et al. | 260/27 |
| 3,639,583 | 2/1972 | Cardarelli et al. | 260/28.5 B |
| 3,794,501 | 2/1974 | DeNio | 260/27 |

*Primary Examiner*—Lewis T. Jacobs
*Attorney, Agent, or Firm*—R. S. Sciascia; L. A. Marsh; W. W. Randolph

[57] ABSTRACT

A polyisobutylene based acoustically transparent, camouflage antifouling paint for coating rubber substrates without adversely affecting the chemical stability and sound absorbing characteristics of such substrates. The composition essentially comprises, by weight, non-volatile ingredients including from about 2% to about 23% polyisobutylene polymer of molecular weight from about 81,000 to 99,000; from about 23% to about 29% rosin; from about 45% to about 57% tributyltin flouride and from about 9% to about 11% pigment.

4 Claims, No Drawings

POLYISOBUTYLENE RUBBER ANTIFOULING PAINT

The invention described herein may be manufactured and used by or for the Government of the United States of America for governmental purposes without the payment of any royalties thereon or therefor.

BACKGROUND OF THE INVENTION

This invention relates to an antifouling composition and more particularly to a rubber based antifouling coating capable of maintaining a preferred pigmentation and being acoustically transparent.

Various types of marine organisms which become attached to the submerged surfaces of ships cause increased drag effects and thus contribute to increased fuel consumption and overall speed reduction. Such organisms also tend to increase ship noise and adversely affect the operation of acoustical devices such as sonar domes and sonar shields by attaching themselves thereto and providing a source of background noise. For example, sonar domes are often provided with smooth rubber surfaces and when affixed thereto, the marine organisms not only destroy the surface integrity of the domes but also provide sites which tend to deflect and scatter the sonar beams. Also, the effectiveness of sonar shields designed to absorb and attenuate sonar beams is reduced by organisms which reflect the incoming sonar beams.

To prevent the accumulation of various marine organisms on rubber and metal substrates attention has been directed toward developing an antifouling coating having a high degree of flexibility and stability, which remains acoustically transparent over the useful life of the coating. For example, U.S. Pat. No. 3,033,809 generally discloses an antifouling coating employing a polyisobutylene polymer and an antifouling agent such as cuprous oxide or mercury compounds including mercuric oxide and mercurous chloride. However, as noted in the abovementioned patent, copper based antifoulants and pigments have a deleterious action on rubber substrates. Additionally, it was found that metal salts and oxides of copper and mercury compounds corrosively react with various metals and alloys.

An additional feature of the present invention not addressed by the prior art is the provision of a camouflage pigment for an antifouling coating which retains its coloration over the useful life of the coating. Copper antifoulants and pigments react with various other paint ingredients and chemical species in seawater such that a characteristic copper coloration eventually pervades the coating and renders the coating unsuitable for most camouflage purposes.

SUMMARY OF THE INVENTION

Accordingly, an object of the present invention is the provision of an improved antifouling coating capable of maintaining a preferred pigmentation and being acoustically transparent.

Another object of this invention is the provision of a rubber based antifouling coating suitable for application on metal and rubber substrates.

A further object of the present invention is the provision of an antifouling coating whereby no deterioration of the substrate or coating is likely to occur.

These and other objects of this invention are met by providing an antifouling composition essentially comprising a rosin and a high molecular weight polyisobutylene rubber mixed with an antifouling agent, tributyltin fluoride (TBTF), in weight proportions which range from 4:100 to 50:100 (polyisobutylene/TBTF). A camouflage pigment is added to the mixture to provide suitable coloration for the coating.

DETAILED DESCRIPTION OF THE INVENTION

The Navy has a current need for a flexible antifouling coating which is adherent and noncorrosive to metal and rubber substrates, acoustically transparent and capable of accepting camouflage pigments. Realizing that copper based antifoulants adversely react with rubber and metal substrates as well as with various pigments employed therewith, attention has been directed toward finding a suitable antifoulant formulation having the abovementioned characteristics. It was found that an antifouling composition generally comprising a high weight polyisobutylene rubber, rosin, tributyltin fluoride antifoulant, carbon black pigment and solvent in the formulations 18R13, 18R14, 1A12 shown below provided suitable antifouling coatings.

TABLE I

| Antifouling Formulations (parts by weight) | | | |
|---|---|---|---|
| | 18R14 | 18R13 | 1A12 |
| Polyisobutylene (Vistanex L-100) | 7.5 | 50 | 50 |
| Rosin (LLL-R-626, Grade WW) | 100 | 50 | 50 |
| Tributyltin Fluoride | 200 | 100 | 100 |
| Carbon Black (Neospectra Mark II or Columbia Raven 8000) | 40 | 20 | 20 |
| Titanium Dioxide (ASTM D476, Type IV) | — | 6 | — |
| Xylene (TT-X-916) | 1395 | — | 651 |
| Paint Thinner (TT-T-291, Type II, Grade A) | — | 650 | — |
| Antioxident (Deenax - Enjay Corp) | — | .05 | — |

Test results of these antifouling formulations conducted at Miami Beach, Fla. are summarized below in Table II. Additionally, these formulations were subjected to normal paint qualification tests for adhesion to neoprene rubbers, sprayability, and manufacturing processes.

TABLE II

| | | Months of Antifouling Resistance of Test Specimens (Front/Back) at Miami, Beach, Florida | | | |
|---|---|---|---|---|---|
| | Test Specimen No. | Months 100% Resistant to Barnacles | Months 80% Resistant to Barnacles | Months 100% Resistant to All Fouling | Months 80% Resistant to All Fouling |
| 1A | (E646-18R14) | 8/7 | 11*/8 | 7/4 | 9/4* |
| 2A | (E647-18R14) | 8/9 | 8/9 | 4/9 | 7/11* |
| 3A | (E648-18R14) | 11*/9 | —/11* | 11*/8 | —/11* |
| 4A | (E649-18R14) | 11*/11* | —/— | 11*/9 | —/11* |
| 5A | (E650-18R14) | 8/11* | 8/— | 7/11* | 8/— |

TABLE II-continued

| | | Months of Antifouling Resistance of Test Specimens (Front/Back) at Miami, Beach, Florida | | | |
|---|---|---|---|---|---|
| Test Specimen No. | | Months 100% Resistant to Barnacles | Months 80% Resistant to Barnacles | Months 100% Resistant to All Fouling | Months 80% Resistant to All Fouling |
| 6A | (E651-18R14) | 8/8 | 11*/11* | 4/4 | 8/11* |
| 7A | (E652-18R14) | 11*/7 | —/9 | 4/4 | 11*/4 |
| 8A | (E653-18R14) | 11*/11* | —/— | 4/4 | 11*/11* |
| 9A | (E654-18R14) | 11*/11* | —/— | 11*/11* | —/— |
| 10A | (E655-18R14) | 11*/11* | —/— | 11*/11* | —/— |
| 1B | (E680-18R13) | 11*/11* | —/— | 11*/11* | —/— |
| 2B | (E681-18R13) | 11*/11* | —/— | 9/11* | 9/— |
| 3B | (E682-18R13) | 11*/6 | —/11* | 11*/4 | —/6 |
| 4B | (E683-18R13) | 11*/11* | —/— | 11*/11* | —/— |
| 5B | (E684-18R13) | 11*/11* | —/— | 11*/11* | —/— |
| 6B | (E685-18R13) | 11*/11* | —/— | 4/11* | 11*/— |
| 1C | (E081-1A32) | 40*/28 | —/40* | 40*/23 | —/40* |
| 2C | (E092-1A32) | 40*/17 | —/40* | 24/9 | 28/35 |
| 3C | (E109-1A32) | 29/34 | 29/39* | 29/29 | 29/29 |
| 4C | (E129-1A32) | 23/34 | 23/34 | 13/19 | 20/34 |
| 5C | (E181-1A32) | 22/28 | 29/33* | 10/10 | 28/28 |
| 6C | (E225-1A32) | 17/17 | 26*/26* | 5/22 | 5/17 |
| 7C | (E232-1A32) | 17/17 | 17/26* | 7/9 | 17/17 |

— or * represent continuing tests

From the abovementioned test results it was determined that the following ranges of nonvolatile constituents provided a suitable antifouling composition:

| Non-Volatile Constituents by Weight Percent | |
|---|---|
| Polyisobutylene | 2-23 |
| Rosin | 23-29 |
| TBTF | 45-57 |
| Pigment (Carbon Black) | 9-11 |

As shown above, the high molecular weight polyisobutylene rubber is mixed with TBTF antifoulant in weight proportions which range from 4:100 to 50:100 (polyisobutylene/TBTF). More particularly, the polyisobutylene employed in the coating has a specific gravity of 0.92 and a viscosity average molecular weight (Staudinger) of from about 81,000 to 99,000. Further, the rosin constituent comprises the cyclic acid ingredient which undergoes dissolution in seawater and various cyclic acids, consistent with the known art, may be employed in the present composition. Although carbon black pigment is used in the present formulations, other pigments such as titanium dioxide and red iron oxide appear to be compatible with the present coating formulation, wherein the type of pigment selected largely depends upon the preferred coating coloration.

As a result of the rather broad range of acceptable combinations of rosin, pigment polyisobutylene and TBTF, the antifouling coating formed thereby is capable of being prepared and applied under a wide range of control conditions. In general, the coating is prepared by cutting or grinding the polyisobutylene into small pieces and dissolving them in the solvent. Thereafter, using techniques well known and commonly used in the art, the TBTF, rosin, pigment and other additives are added and mixed into the solution. The result of such a procedure is a coating capable of being acoustically matched with the selected rubber and metal substrates.

Obviously many modifications and variations of the present invention are possible in the light of the above teachings. It is therefore to be understood that within the scope of the appended claims the invention may be practiced otherwise than as specifically described.

What is claimed is:

1. A camouflage antifouling composition essentially comprising, by weight, non-volatile ingredients including from about 2% to about 23% polyisobutylene polymer having a molecular weight from about 81,000 to about 99,000; from about 23% to about 29% rosin; from about 45% to about 57% tributyltin fluoride and from about 9% to about 11% pigment; the remainder of the composition being principally a volatile solvent.

2. The composition according to claim 1 wherein said pigment comprises carbon black.

3. An antifouling composition consists essentially, by weight, of from about 2% to about 23% polyisobutylene polymer having an average molecular weight of from about 81,000 to about 99,000; from about 23% to about 29% rosin; from about 45% to about 57% tributyltin fluoride; and the remainder of the composition principally comprising pigment and a volatile solvent.

4. An antifouling composition for rubber substrates consists essentially, by weight, of from about 2% to about 23% polyisobutylene polymer having an average molecular weight of from about 81,000 to about 99,000; from about 45% to about 57% tributyltin fluoride; and the remainder of the composition principally comprising rosin, pigment, and a volatile solvent.

* * * * *